United States Patent [19]
Petersen et al.

[11] 3,759,338
[45] Sept. 18, 1973

[54] DIAL MOUNTING FOR WEIGHING SCALE

[75] Inventors: Svend A. H. Petersen; Padraic E. Neary, both of Co. Sligo, Ireland

[73] Assignee: Hanson Limited, Sligo, Ireland

[22] Filed: June 1, 1972

[21] Appl. No.: 258,839

[52] U.S. Cl. .............................. 177/173, 177/256
[51] Int. Cl. ........................................... G01g 21/18
[58] Field of Search .................. 177/173, 174, 164, 177/165, 167, 168, 230, 231, 256, 257; 287/20.92 A, 20.92 D, 20.92 J

[56] References Cited
UNITED STATES PATENTS

| | | | |
|---|---|---|---|
| 958,172 | 5/1910 | Puffenberger | 177/231 X |
| 1,656,267 | 1/1928 | Craig | 177/231 X |
| 2,255,110 | 9/1941 | Garbell | 177/167 X |
| 3,161,244 | 12/1964 | Hanssen | 177/173 |
| 1,680,192 | 8/1928 | Zucker | 177/167 |
| 1,902,233 | 3/1933 | Hanssen | 177/167 |
| 1,982,939 | 12/1934 | Weber | 177/174 |
| 3,169,594 | 2/1965 | Myers | 177/173 |
| 3,167,144 | 1/1965 | Jacobs et al. | 177/173 X |
| 3,405,775 | 10/1968 | Grady et al. | 177/230 X |

FOREIGN PATENTS OR APPLICATIONS

| | | | |
|---|---|---|---|
| 1,389,971 | 1965 | France | 177/168 |

Primary Examiner—Richard B. Wilkinson
Assistant Examiner—Stanley J. Witkowski
Attorney—Axel A. Hofgren et al.

[57] ABSTRACT

An indicating device for a platform weighing scale including a rotatable shaft having a pinion fixed thereon adapted to engage a reciprocable rack, a dial support plate mounted on the shaft for rotation therewith, a dial mounted on the support plate including weight indicating indicia, interlocking bayonet slots and locking lugs on the dial and support plate for holding the dial on the plate, and a central aperture in the dial for receiving an end portion of the shaft when the dial is locked on the support plate.

7 Claims, 3 Drawing Figures

Patented Sept. 18, 1973

3,759,338

3,759,338

DIAL MOUNTING FOR WEIGHING SCALE

BACKGROUND OF THE INVENTION

The present invention relates to a platform type weighing scale often used in bathrooms and like places.

Typically, such a scale includes a base with pivotally mounted levers spring-biased upwardly to support a weighing platform. When a person steps on the platform, movement of the levers against the spring bias actuates an indicating dial relative to a reference line in a manner to show the weight of the person on the scale. More particularly, the levers may be connected to actuate a reciprocable rack for rotating an upright shaft carrying the indicating dial. Prior U.S. Pat. Nos. 2,960,329 and 3,134,451 show scales of the type described.

In the prior scales, the indicating dial is a relatively large circular disc of thin metal material having a central portion attached to the rotatable shaft and supported in an area around the shaft. In the prior patents identified above, support for the central portion of the dial is provided by a circular supporting plate mounted on the shaft. The plate includes pins projecting into apertures of the dial so that the two rotate together, and a nut on the end of the shaft secures the dial to the plate.

It is desirable to simplify the mounting of the indicating dial on the rotatable shaft.

SUMMARY OF THE PRESENT INVENTION

It is a general object of the present invention to provide an improved mounting of an indicating dial on a supporting shaft.

A more specific object is to provide an indicating device of the type described including a dial support plate rotatable with a supporting shaft, an indicating dial mounted on the support plate, and interlocking bayonet slots and locking lugs on the dial and the plate for holding the dial on the plate.

Another object is to provide an improved indicating device as described above including a central aperture in the dial for receiving an end portion of the shaft when the dial is locked on the support plate.

As illustrated herein, an indicating device embodying the principles of the present invention includes a rotatable shaft having a pinion fixed thereon adapted to engage a reciprocable rack, bearing portions on the shaft at opposite ends of the pinion for rotatably mounting the shaft in an upright position, a knurled portion on an upper length of the shaft, a dial support plate including a central hub tightly fitted on the knurled portion and rotatable with the shaft, an indicating dial mounted on the support plate, bayonet slots in the dial, and locking lugs on the support plate positionable in the bayonet slots in the dial and including enlarged heads for locking the dial on the plate when the lugs are moved laterally in the slots.

DETAILED DESCRIPTION OF PREFERRED EMBODIMENT

Figure 1:
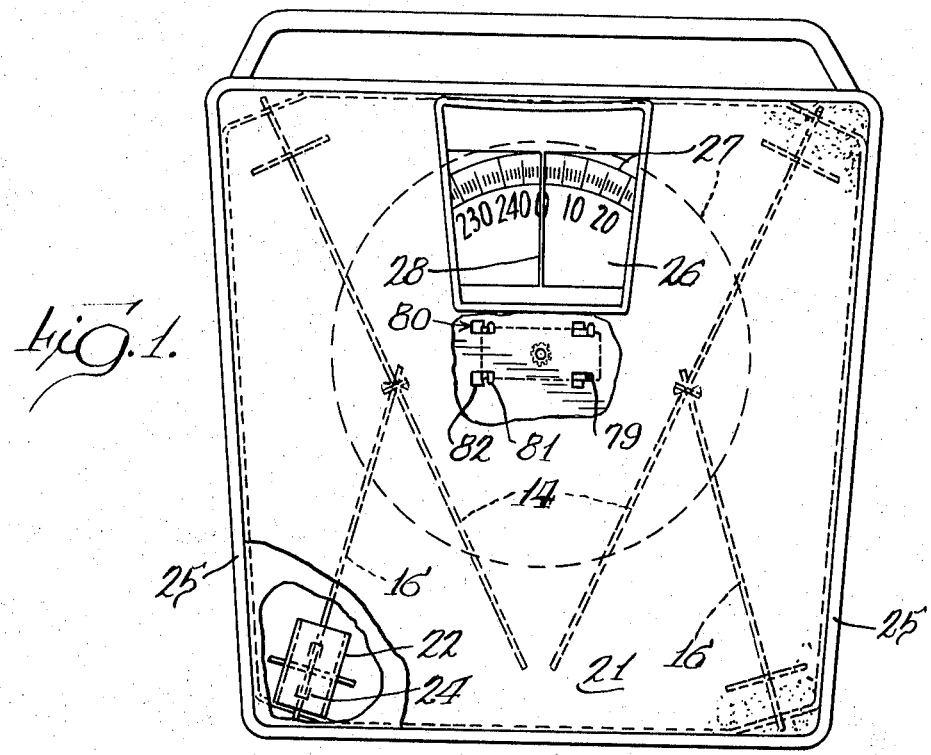
FIG. 1 is a top plan view, partly broken away, showing a bathroom scale embodying the principles of the present invention.

Referring now to the drawings in more detail, a platform type bathroom scale is provided with a base supporting pivoted weight-receiving levers. A decorative cover or platform fits telescopically over the base and is supported by the levers. A weight indicating mechanism is responsive to deflection of the levers and carries a dial which may be viewed through a window in the cover to indicate the amount of weight on the platform relative to a stationary reference line.

More particularly, the scale includes a base generally indicated at 10, formed as a stamped sheet metal member having an integral upstanding peripheral rim 11 with corner portions 12. The shape of the base may be of any configuration but in the present instance it is illustrated as generally rectangular. The base is adapted to rest directly on a floor or floor covering and support the mechanism of the scale therein. For supporting the pivoted levers, upright slots are formed as at 13 in the corner portions 12 of the base.

Figure 2:
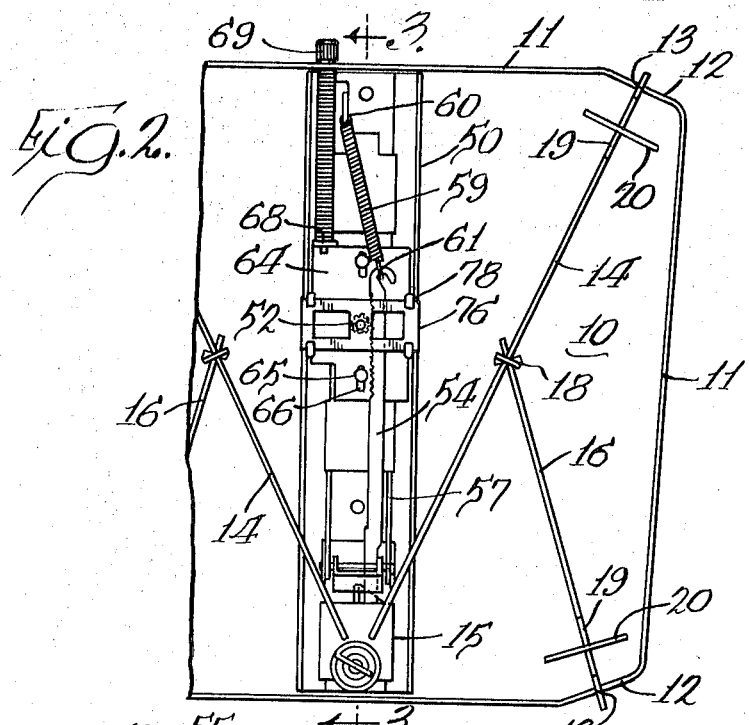
FIG. 2 is a fragmentary plan view with the platform and the indicating dial removed.
Figure 3:
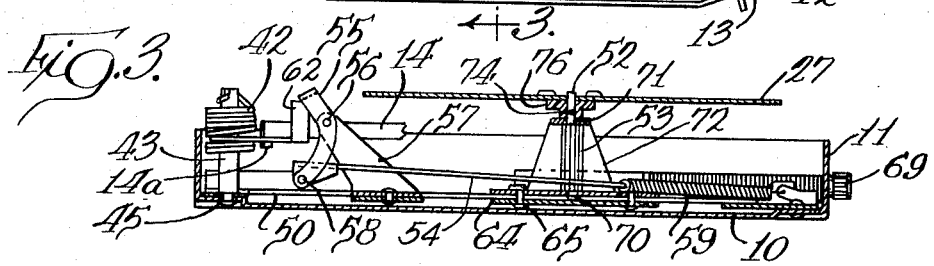
FIG. 3 is a vertical sectional view taken at about the line 3—3 of FIG. 2, but including the indicating dial.

The weight sensing mechanism as illustrated in FIGS. 1–3 consists of a pair of primary levers 14 and a pair of secondary levers 16 pivotally mounted in the slots 13 at the corner portions of the base. The primary levers 14 are pivotally mounted at the rear of the base and extend forwardly in a converging fashion to a common support in the form of a plate 15 adjacent the front of the base. The secondary levers 16 are pivotally mounted at the front corners of the base and extend rearwardly in converging fashion. The rear end of each of the secondary levers 16 is connected to a primary lever 14 intermediate its ends as at 18. Each of the primary and secondary levers has a V-shaped notch 19 located near the pivoted end for supporting knife edge metal hangers 20 which rest on the V portion of each respective lever.

A platform 21 is adapted to support the weight of a person for weighing. The platform is preferably provided with four depending U-shaped brackets as at 22, each having a V-shaped lower surface adapted to rest on the knife edge hangers 20. The depending brackets 22 may be attached to the platform by suitable means as at 24. The platform is preferably formed with a depending skirt 25 at the perimeter extending around the base and hiding much of the latter from view.

The platform 21 provides a weight-receiving surface upon which a person may stand, whereupon the weight is transferred by the brackets 22 and the hangers 20 to the levers 14 and 16, causing the levers and the plate 15 to move toward the floor. A transparent magnifying lens 26 is provided in an aperture in the platform through which an indicating dial 27 may be viewed. The weight of the person on the scale may be read as that amount shown on the dial beneath a reference line 28 provided on the lens 26.

The weight-receiving levers 14 and 16 are counterbalanced by the supporting plate 15. The front end portions of the primary levers 14 are secured to the plate 15 by rearwardly turned tabs 14a. A coiled tension spring 42 is mounted on a pivotable post 43, and the bottom coils of the spring support the plate 15. The swivel post 43 has a slot across its upper end for receiving and supporting the top end of the coiled spring. The post 43 extends through the plate 15 and the spring 42, and has a pivotal mounting on the base at 45 to permit limited pivotal movement of the post laterally and longitudinally of the base. If desired, the cover or platform 21 may be releasably and yieldably retained in position on the base 10 by means of coiled tension springs (not shown) connected between the platform and the base.

The weight indicating dial is adapted to be actuated by movement of the levers 14 and 16 against the bias of the spring 42. The dial actuating mechanism is mounted on a channel support 50 secured to the base 10 at a position generally centrally located on the base. The weight indicating dial 27 is secured on the upper end of an upright rotatable shaft 52 carrying an integral pinion gear 53 for rotating the shaft. The pinion gear 53 engages a generally horizontally extending rack gear 54 having a front end portion pivotally secured to a bell crank lever 55. The bell crank is generally U-shaped and pivotally mounted on a rod 56 extending transversely through the bell crank and pivotally journalled on a support member 57. The rack 54 is pivotally connected at 58 to the lower end of the bell crank so that the rack moves with the bell crank. The rack is held in contact with the pinion gear 53 by means of a spring 59 connected at 60 to the channel support 50 and connected at 61 to the rack 54.

An upstanding ear 62 on the plate 15 forms a bearing under the bell crank lever 55 so that deflection of the levers 14 and 16 allows movement of the bell crank and the indicating mechanism, under the influence of spring 59.

As seen in FIGS. 2 and 3, the channel support 50 extends substantially the entire length of the scale in a front-to-rear direction and has a carriage 64 slidable thereon by means of pins as at 65 on the support 50 positioned in slots as at 66 in the carriage 64. A spindle is mounted in the upstanding rim 11 of the base 10 and connected to the carriage 64 at 68. The spindle terminates in a knob 69 accessible from the outside of the scale so that turning the knob moves the spindle threadably longitudinally to move the carriage longitudinally of the base. The carriage supports the shaft 52 and the pinion gear 53. As the carriage moves longitudinally of the rack, the indicating dial may be adjusted to a zero reading without any weight on the scale.

The shaft 52 is rotatably supported on the adjustable carriage 64. In particular, the lower end of the shaft is formed with a reduced bearing portion 70 rotatably mounted in the carriage 64 beneath the pinion 53. At the upper end of the pinion 53, the shaft is formed with an additional bearing portion 71 rotatably mounted in the crosspiece of an upright bracket 72 secured on the carriage 64. Adjacent the bearing portion 71, the shaft is formed with a knurled portion 74 tightly fitted in a support plate 76 in turn secured to the dial 27. An upper end portion of the shaft 52 projects through a central aperture in the dial 27.

The dial supporting plate 76 is formed in a generally rectangular 8-shape, and adjacent the four corners, the plate is formed with upstanding locking lugs 78 adapted to cooperate with bayonet slots 80 formed in the dial 27. Each of the lugs 78 includes a reduced stem portion 79 (FIG. 1) having a short height about equal to the thickness of the thin metal dial 27. At the top, each stem has an enlarged head 81.

On assembly of the indicating mechanism, the enlarged heads 81 of the lugs 78 are inserted from the bottom through the enlarged portions 82 of the bayonet slots, and then the dial is moved laterally (to the left as viewed in FIGS. 1 and 2) to a position where the reduced stems 79 of the lugs 78 are positioned in the narrow portions of the bayonet slots and the enlarged heads 81 overlie the adjacent material of the dial. In this manner, the dial is firmly secured to the supporting plate to rotate with the plate, and at the same time, the plate reinforces the central portion of the dial. When the locking lugs 78 are positioned in the narrow slot portions, a central aperture in the dial is aligned with the central hub of the supporting plate, and the shaft 52 may project through the aperture in the dial to retain the dial on the supporting plate against lateral movement which might lead to unlocking.

We claim:

1. An indicating device for a platform weighing scale, comprising,
   a. a rotatable shaft having a pinion fixed thereon adapted to engage a reciprocable rack,
   b. a dial support plate fixed on the shaft for rotation therewith,
   c. a dial mounted on the support plate including weight indicating indicia, and
   d. interlocking bayonet slots and headed locking lugs on the dial and support plate for holding the dial on the plate.

2. An indicating device as defined in claim 1, including bearing portions on the shaft at opposite ends of the pinion for rotatably mounting the shaft in support bearings.

3. An indicating device as defined in claim 1, including a knurled portion on the shaft and a central hub on the support plate tightly fitted on the knurled portion for rotation together.

4. An indicating device as defined in claim 1, including a central aperture in the dial for receiving an end portion of the shaft when the dial is locked on the support plate.

5. An indicating device for a platform weighing scale, comprising,
   a. a rotatable shaft having a pinion fixed thereon adapted to engage a reciprocable rack,
   b. a dial support plate fixed on the shaft for rotation therewith,
   c. a dial mounted on the support plate including weight indicating indicia,
   d. interlocking bayonet slots and headed locking lugs on the dial and support plate for holding the dial on the plate,
   e. said support plate having upstanding locking lugs adjacent the corners thereof each including a reduced stem and an enlarged head, and
   f. said dial having bayonet slots for receiving the locking lugs each slot including an enlarged portion for passing the enlarged head of a lug and a reduced portion for receiving the reduced stem of a locking lug with the head in locking position.

6. For use in a bathroom scale having a platform supported by spring-biased levers arranged to actuate a reciprocable rack gear for indicating weight, an indicating device, comprising,
   a. a shaft adapted to be rotatably mounted in upright position,
   b. a gear on the shaft adapted to engage an actuating rack.
   c. bearing portions on the shaft at opposite ends of the gear rotatably mountable in bearings,
   d. a knurled portion on an upper length of the shaft, e. a dial support plate including a central hub tightly fitted on the knurled portion and rotatable with the shaft,
f. an indicating dial mounted on the support plate,
g. bayonet slots in the dial, each including a relatively wide portion and a relatively narrow portion,
h. locking lugs on the support plate positionable in the bayonet slots in the dial including enlarged heads insertable through the relatively wide portion of the slots for locking the dial on the plate when the lugs are moved laterally in the narrow portion of the slots, and
i. a central aperture in the dial aligned with said central hub for receiving the upper end of the shaft when the dial is in locked position on the plate.

7. An indicating device for a platform weighing scale, comprising, a. a rotatable shaft having a pinion integral thereon adapted to engage a reciprocable rack,
b. a dial support having a central hub frictionally mounted on the shaft for rotation therewith,
c. a dial mounted on the support including weight indicating indicia,
d. upstanding locking lugs on the support each including a reduced stem and an enlarged head,
e. bayonet slots in the dial each including an enlarged portion for passing the enlarged head of a lug and a reduced portion for receiving the reduced stem of a locking lug with the head in locking position, and
f. a central aperture in the dial aligned with said central hub for receiving an end portion of the shaft when the dial is locked on the support plate.

* * * * *